US006937293B2

(12) United States Patent
Van Dijk et al.

(10) Patent No.: US 6,937,293 B2
(45) Date of Patent: Aug. 30, 2005

(54) IMAGE DISPLAY UNIT FOR AND METHOD OF DISPLAYING PIXELS AND IMAGE DISPLAY APPARATUS COMPRISING SUCH A DISPLAY UNIT

(75) Inventors: Roy Van Dijk, Eindhoven (NL); Gerard David La Hei, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 536 days.

(21) Appl. No.: 10/078,937

(22) Filed: Feb. 19, 2002

(65) Prior Publication Data

US 2002/0140873 A1 Oct. 3, 2002

(30) Foreign Application Priority Data

Feb. 21, 2001 (EP) ........................................... 01200622

(51) Int. Cl.[7] .................................................. H04N 5/14
(52) U.S. Cl. .......................... 348/701; 348/797; 345/63
(58) Field of Search ................................ 348/699, 701, 348/700, 797, 607, 571; 375/240.08; 345/63, 72, 88, 89, 204, 690, 474

(56) References Cited

U.S. PATENT DOCUMENTS 5,384,912 A * 1/1995 Ogrinc et al. ............... 345/501
6,496,194 B1 * 12/2002 Mikoshiba et al. ......... 345/596

FOREIGN PATENT DOCUMENTS

EP 0973147 A 1/2000 ............ G09G/3/20

OTHER PUBLICATIONS

"Motion Compensation in Plasma Displays", Proceedings of The Fifth International Display Workshops, IDW 1998, pp. 543–546.

* cited by examiner

*Primary Examiner*—Victor R. Kostak
(74) *Attorney, Agent, or Firm*—Edward W. Goodman

(57) ABSTRACT

An image display unit (100) displays an image on a display device (406), like a plasma display panel, in a number of sub-fields (204–218). The image display unit can perform motion compensation to reduce motion artifacts. This motion compensation is performed by applying a spatial offset to the sub-fields. The image display unit is designed to perform the operations for motion compensation on operands with various granularity, with the granularity of the operands ranging from one sub-field individually to a group of sub-fields together. An embodiment of the image display unit includes an analyzer (110) for estimating the available capacity of a computing unit (108) in a predetermined period of time, in order to determine the granularity of the operands to perform the operations for motion compensation.

10 Claims, 4 Drawing Sheets

IMAGE DISPLAY UNIT FOR AND METHOD OF DISPLAYING PIXELS AND IMAGE DISPLAY APPARATUS COMPRISING SUCH A DISPLAY UNIT

BACKGROUND OF THE INVENTION

1. Field Of The Invention

The invention relates to an image display unit for displaying pixels of an image in a plurality of periods, called sub-fields, on a display device, which is capable of generating, in each of the sub-fields, a respective illumination level, and which comprises computing means to perform operations on sub-fields for motion compensation.

The invention further relates to an image display apparatus comprising:

receiving means for receiving a signal representing the image;

a display device for displaying the image; and an image display unit for displaying pixels of an image in a plurality of periods, called sub-fields, on a display device, which is capable of generating, in each of the sub-fields, a respective illumination level, and which comprises computing means to perform operations on sub-fields for motion compensation.

The invention further relates to a method of displaying pixels of an image in a plurality of periods, called sub-fields, on a display device, which is capable of generating, in each of the sub-fields, a respective illumination level, comprising a motion compensation step on sub-fields.

2. Description Of The Related Art

An image display unit of the kind described in the opening paragraph, is known from the article "Motion Compensation in Plasma Displays", Proceedings of The Fifth International Display Workshops, IDW 1998, pages 543–546. In this article, it is described that on current plasma display panels, disturbing motion artifacts are perceived as dynamic false colors or pseudo-color appearances due to sub-field illumination scaling. The article summarizes that many solutions have been proposed to reduce these artifacts, for instance, changing the order of displayed sub-fields; applying bit or sub-field splitting to divide major sub-fields; and scattering false colors by multiple sub-fields with equal illumination levels in which the same illumination levels are generated by different combinations of these sub-fields. None of these methods eliminate the basic cause of the problem. They only try to mask the effect in areas with a small spatial luminance gradient. The article provides an analysis of the problem of motion artifacts. The motion artifact itself is due to the tracking of motion by the observer's eyes, and the time difference between the various sub-fields that are displayed. Due to the tracking of motion, various sub-fields that ought to be perceived at one position of the eye, are perceived at different positions, and the different sub-fields from nearby pixels are accumulated at the same position on the retina and contribute to the illumination level that is perceived instead of the intended one. When an observer focuses on a moving object, he will start tracking the movement. The object is kept at exactly one position on the retina. Due to the speed, $\vec{v}=(v_x,v_y)$, of this object, a certain distance is traveled while following this object for a certain period. When this same object is observed on a plasma display panel, the positions seen are determined by the starting position, $\vec{x}=(x,y)$, of this object and the time difference, $\Delta t_n$, of the observed sub-field, $SF_n(\vec{x})$. The observed luminance at this position, $L(\vec{x})$, when this motion is being tracked by the observer, is determined by the observed positions on the screen. This depends on whether or not sub-field $SF_n(\vec{x})$ at position $\vec{x}$, is on, and on the illumination level $W_n$ of this sub-field:

$$L(\vec{x}) = \sum_{n=1}^{N} SF_n(\vec{x} + \vec{v}\cdot\Delta t_n)\cdot W_n \tag{1}$$

with $\Delta t_n=t_n-t_0$, the time difference between sub-field n and the reference time $t_0$, and the speed $\vec{v}$ expressed in pixels per field period.

The article also provides a solution for the problem of motion artifacts, i.e., motion compensation. Motion compensation can reduce dynamic false contouring and pseudo-color appearance without reduction in sharpness or loss of detail. Motion compensation attempts to position the sub-field values of that one pixel that is being tracked exactly at the positions on the display panel that are observed at the time the sub-fields are generated and at the position that is seen. It can be inferred from Equation 1 that a spatial offset of $\vec{d}_n=(dx_n,dy_n)$, must be given to each sub-field $SF_n(\vec{x})$, to be able to place these sub-fields at the correct positions, resulting in a luminance:

$$L(\vec{x}) = \sum_{n=1}^{N} SF_n(\vec{x} + \vec{v}\cdot\Delta t_n - \vec{d}_n)\cdot W_n \tag{2}$$

In order to avoid artifacts, $\vec{d}_n$ is chosen to be:

$$\vec{d}_n=\vec{v}\cdot\Delta t_n-\vec{d}_n^{\,e} \tag{3}$$

with $\vec{d}_n=(dx_n,dy_n)$ the displacement in the horizontal and the vertical directions, which is rounded to integer values, and $\vec{d}_n^{\,e}=(dx_n^e,dy_n^e)$ the rounding error. A sub-field must be displayed over an integer number of pixels, because no parts of a pixel can be switched on or off. The spatial offset $\vec{d}_n=(dx_n,dy_n)$ for each sub-field can be calculated by making use of a motion vector $\vec{m}_{x,y}$ of the corresponding pixel:

$$\vec{d}_n = \frac{t_n}{T_{field}}\cdot\vec{m}_{x,y} \tag{4}$$

where $T_{field}$ denotes the time of one field period.

The number of operations required for achieving motion compensated images, i.e., spatially corrected sub-fields, is relatively high. The operations include memory accesses and processor calculations to determine the spatially corrected sub-fields. Especially in the case of a programmable processor architecture, this relatively high number of operations requires large computer resources, resulting in relatively high costs.

SUMMARY OF THE INVENTION

It is a first object of the invention to provide an image display unit of the kind described in the opening paragraph, that performs a variable number of operations without or with only a limited reduction in image quality.

It is a second object of the invention to provide an image display apparatus comprising such an image display unit.

It is a third object of the invention to provide a method of the kind described in the opening paragraph, with a relatively small and variable number of operations without or with only a limited reduction in image quality.

The first object of the invention is achieved in that computing means is designed to perform the operations for motion compensation on operands with varying granularity, with the granularity of the operands ranging from one sub-field individually to a group of sub-fields simultaneously. The image display unit is designed to give the spatial offset to each of the sub-fields individually or to give the spatial offset to a group of sub-fields together. The pixels of an image, to be visualized with a display panel, may be digitally stored in a memory device. The bytes in memory contain sub-field data; each bit defines if the corresponding sub-field is on or off at the particular pixel position. With one byte, eight independent sub-fields can be controlled. Notice that words of other length, e.g., 10 or 12 bits, can also be used. Performing motion compensation means that a destination image is derived from a source image. Bits, representing sub-fields in the source image, are retrieved from the memory device storing the source image and stored in the memory storing the destination image. A spatial offset can be applied on the bits by changing the logical address of the bits. Copying bits or bytes is an operation that does not require much of the computer resources. However, accessing separate bits or bytes can cause a significant memory transfer overhead. Many memory devices are designed such that with one data access request, a data-block is returned with a logical size of several bytes. If only one of the bits, of the data-block that is returned, is needed, then a lot of memory bandwidth is wasted. In general, motion compensation requires the same number of operations independent of the operand type. Hence, the granularity of the operands for motion compensation determines the total number of operations. The operands can be:

bit, which corresponds to sub-field;

group of bits, which corresponds to some sub-fields of one pixel;

group of bits, which corresponds to sub-fields of a number of pixels, e.g., with equal illumination level;

byte, which corresponds to the sub-fields of one pixel;

group of bytes, which corresponds to the sub-fields of a group of pixels.

The highest possible quality of motion compensation is achieved in case of fine-grain operands, i.e., bits. The image display unit according to the invention has the advantage of allowing scalability in making use of the available computer resources. If the capacity of available computer resources is relatively high, then a relatively high quality of motion compensation can be achieved.

An embodiment of the image display unit according to the invention comprises an analyzer to estimate available capacity of the computing means for a predetermined period of time, in order to determine the granularity of the operands to perform the operations for motion compensation. In general, computer resources can be used for performing various tasks. There may be a system comprising several data processing units, with each being responsible for a certain task. The image display unit of this embodiment is one of the units of the system. The system includes computer resources, e.g., memory and processor, that can be shared by the various data processing units. The number of tasks that can be executed concurrently is, among others, limited by the size of the shared computer resources and the claim for usage of the computer resources to perform the various tasks. This means that units that are designed to have a relatively low computer resource usage are favorable. The actual claim for computer resources by a unit can be variable in time. The result is that the available computer resources for the other units in the system is also not constant. It is an advantage of the image display unit according to the invention that it can adapt its strategy for motion compensation based on the computer resources that are available for the image display unit. The image display unit of this embodiment estimates the available computer resources for a predetermined period of time and determines, based on that, the granularity of the operands, to perform the motion compensation with the best achievable quality. Information about availability of computer resources might also be provided by external means. Performed calculations for previous images can be used to determine the claim on the computer resources for subsequent images. Motion compensation requires the same number of operations independent of the number of sub-fields per group or of the illumination level of a sub-field. If the available computer resources are known, i.e., the number of operations that can be performed is known, then an estimate can be made of the number of groups that can be compensated. This determines the granularity of the operands, i.e., the number of sub-fields per group. The result is that the image display unit of this embodiment is flexible in making use of the available computer resources in order to make a trade off between a relatively high quality of motion compensation in combination with a relatively high computer resource usage, versus a relatively less high quality of motion compensation in combination with a relatively less high computer resource usage.

An embodiment of the image display unit according to the invention is arranged to categorize the pixels of the image in a first subset of pixels on which relatively few operations for motion compensation are to be performed, and a second subset of pixels on which more operations for motion compensation are to be performed. The first subset of pixels does not require motion compensation and the second subset does require motion compensation. The pixels of the first subset might belong to non-moving objects in the scene that has been imaged. The pixels in which no motion is detected, $\vec{v}=\vec{0}$, do not have to be motion compensated. The bytes corresponding to the pixels in which no. motion is detected can be directly copied from the memory related to the source image to the memory related to the destination image. No further processing is required for these pixels. It can be inferred from Equation 1 that the image observed conforms to:

$$L(\vec{x}) = \sum_{n=1}^{N} SF_n(\vec{x}) \cdot W_n \tag{5}$$

which is exactly the combination of the sub-fields for one pixel as intended. Also, pixels that belong to relatively fast moving objects in the scene that has been imaged, can be part of the set that does not require motion compensation. The visible effect of motion compensation for these pixels might be negligible.

An embodiment of the image display unit according to the invention is arranged to categorize the sub-fields of a pixel in a first group of sub-fields on which relatively few operations for motion compensation are to be performed, and a second group of sub-fields on which more operations for motion compensation are to be performed. The first subset of sub-fields will not be motion compensated and the second subset of sub-fields will be motion compensated. The bits corresponding to the sub-fields of the first subset of sub-fields can be directly copied from the memory related to the source image to the memory related to the destination image. The sub-field with the highest illumination level is taken as a point of reference. Hence, this sub-field is displayed at the correct spatial position. Note that $t_n=t_0 \rightarrow \Delta t_n=t_n-t_0=0$. It can be inferred from Equation 1 that the image observed conforms to Equation 5. The bit corresponding to the sub-field that is taken as the point of reference can be directly copied from the memory related to the source image to the memory related to the destination image. No further processing is required for that bit. The image display unit shifts, i.e., applies a spatial offset to, the remaining bits corresponding to the sub-fields in order of importance from the second highest sub-field to the lowest illumination levels. When not enough computer resources are available, this can be terminated at any time. In that case, the sub-fields with the highest illumination levels, are processed. Note that the memory device for storing the data representing the destination image, is initialized by making a straight copy of the data representing the source image.

An embodiment of the image display unit according to the invention is characterized in that the group of sub-fields belongs to a block of pixels. In this way, motion compensation is applied to a block of pixels. The logical size of the data that corresponds with such a block of pixels may fit to the connection to the memory device that maintains the pixels, i.e., the bandwidth of a memory bus, or to the physical size of data-units of the memory device that can be accessed in burst mode, or to the size of a motion vector block.

An embodiment of the image display unit according to the invention is characterized in that the group of sub-fields corresponds to the sub-fields of one pixel. The logical size of the data that corresponds with such a group may be equal to one word, e.g., of one byte. A byte is a basic operand type of a computer. In that case, many operations can be performed very efficiently.

An embodiment of the image display unit according to the invention is characterized in that the group of sub-fields corresponds to a number of the sub-fields of one pixel. This means that the sub-fields of one pixel are spread over a number of groups. There are at least two strategies to divide the sub-fields of one pixel into these groups. These strategies are outlined in the description of the following two embodiments. The timing of a group can be averaged for the members of the group or determined by the sub-field of this group with the highest illumination level. The result is that the spatial offset to be applied is based on the weighted average for the members of a group, respectively determined by the sub-field of this group with the highest illumination level.

An embodiment of the image display unit according to the invention is characterized in that the group of sub-fields contains sub-fields that are relatively close together in time. Note that in that case, the differences in spatial offset to be applied to the individual sub-fields of this group, to achieve the highest possible motion compensation, are relatively small. A good solution, in this case, is to base the timing of the group on the average for the members of the group. If the motion of objects in the scene that has been imaged is relatively low, then the differences between the required spatial offsets for the various sub-fields might even be less than one pixel. In equation notation, this can be expressed as $\|\vec{d}_i - \vec{d}_j\| \leqq 1$.

An embodiment of the image display unit according to the invention is characterized in that the group of sub-fields contains a sub-field with a relatively high illumination level and at least one sub-field with a relatively low illumination level. A good solution, in this case, is to base the timing of the group on the timing of the sub-field of this group with the highest illumination level. The result is that the sub-field that contributes most to the total illumination of the pixel is compensated as good as achievable.

The second object of the invention is achieved in that the image display apparatus comprises the image display unit.

The third object of the invention is achieved in that the motion compensation step is performed on operands with varying granularity, with the granularity of the operands ranging from one sub-field individually to a group of sub-fields simultaneously.

BRIEF DESCRIPTION OF THE DRAWINGS

These and other aspects of the display unit, the apparatus and the method according to-the invention, will become apparent from and will be elucidated with reference with respect to the implementations and embodiments described hereinafter and with reference to the accompanying drawings, wherein.

DESCRIPTION OF THE PREFERRED EMBODIMENTS

Figure 1:
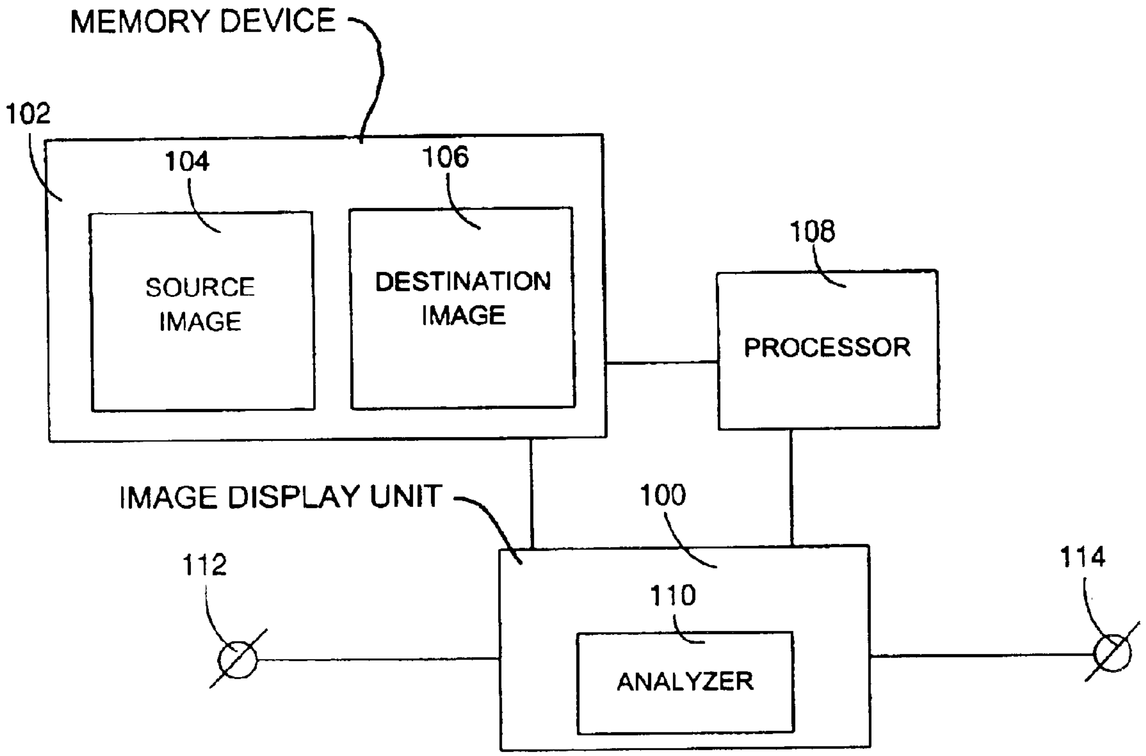
FIG. 1 schematically shows an image display unit in its context.
Figure 3:
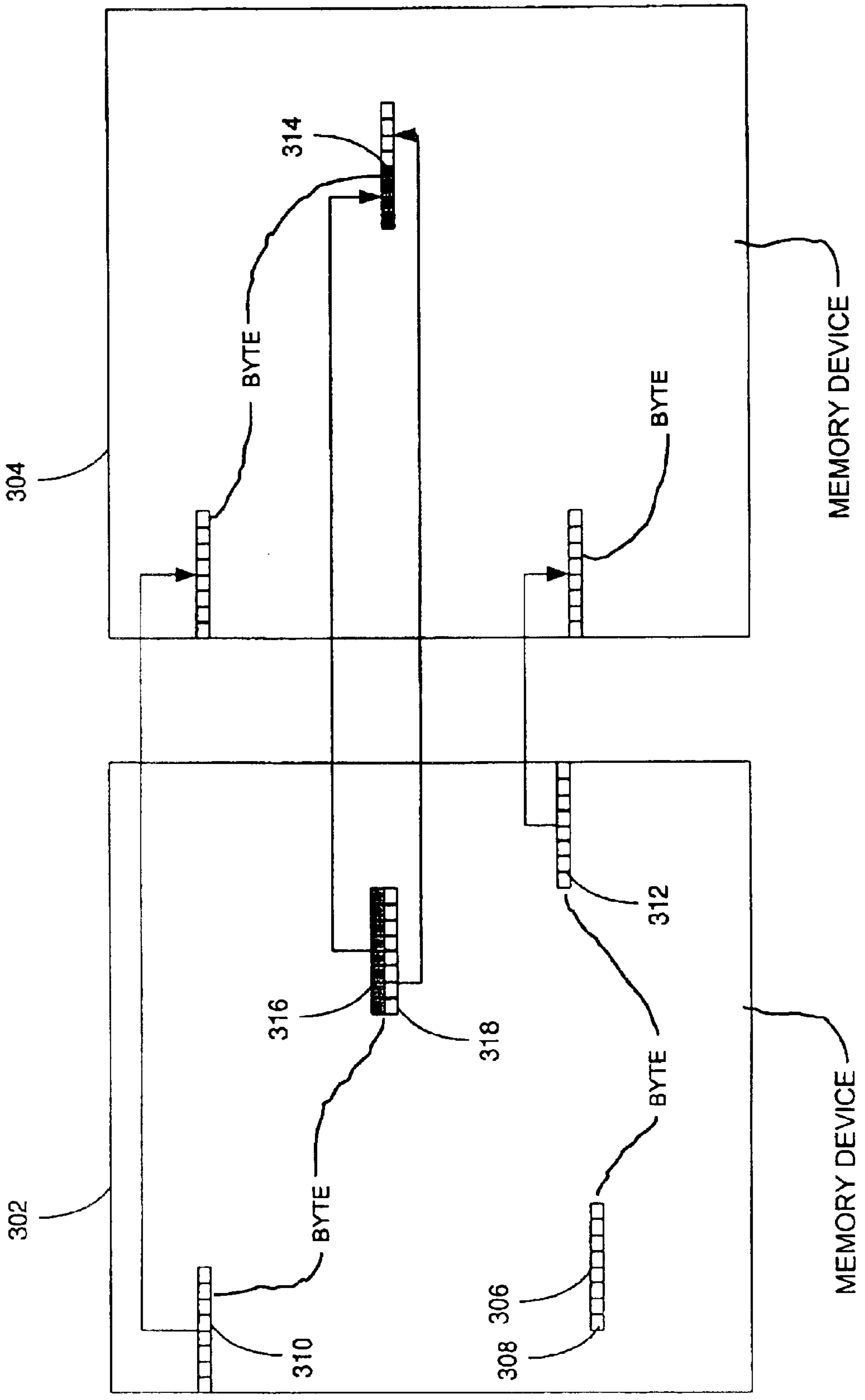
FIG. 3 shows the principle of the invention.

FIG. 1 schematically shows an embodiment of the image display unit 100 according to the invention. FIG. 1 also shows a memory device 102. In this embodiment, the memory device 102 is not part of the image display unit 100. But there may be embodiments that comprise a memory device. The image display unit 100 receives, as an input, a signal representing a source image by the input connector 112. The image display unit 100 provides, as an output, a signal representing a destination image at the output connector 114. The memory device 102 maintains data representing the two images. The processing means 108 retrieves data from the memory location storing the source image 104. Then, the processing means can apply a spatial offset in order to motion compensate one or more sub-fields. Eventually, the processing means 108 stores data in the memory location storing the destination image 106. In FIG. 3, the operations for motion compensation are outlined in more detail. The display unit 100 optionally comprises an analyzer 110 that is designed to analyze the capacity of the available computer resources.

Figure 2:
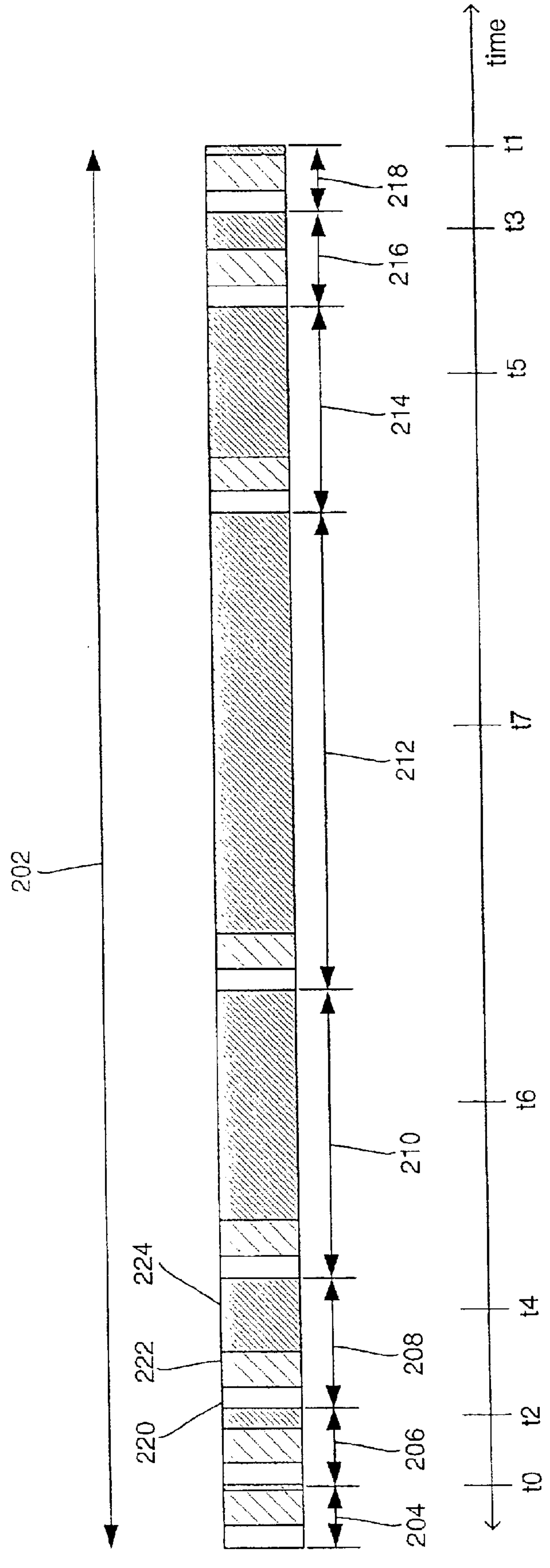
FIG. 2 schematically shows a field period with 8 sub-fields.

FIG. 2 schematically shows a field period 202 with 8 sub-fields. Field period 202 is the period in which a single image is displayed in the display panel. In this example, the field period 202 consists of 8 sub-fields 204–218. In a sub-field, e.g., 208, a cell of the display panel may be switched on in order to produce an amount of light. Each sub-field 204–218 starts with an erasure phase 220 in which the memories of all cells are simultaneously erased. The next phase in the sub-field 208 is the addressing phase 222, in which the cells that are to be switched on for emitting light are conditioned. Then, in a third phase 224 of the sub-field 208, which is called the sustain phase, sustain pulses are applied to the cells. This causes the cells that have been addressed, to emit light during the third phase. The organization of these phases is shown in FIG. 2, where time runs from left to right. Moments of time t0–t7 for the various sub-fields are also indicated. It is to be noted that in some display panels, the sub-field ends with the erasure phase rather than starting with it. However, this is of no significance to the invention which can be applied in either case. The erasure phase may also be absent for some sub-field schemes.

FIG. 3 shows the principle of the invention. Performing motion compensation means that a destination image is derived from a source image. In FIG. 3, a memory device 302 is shown which maintains the data representing the source image. In FIG. 3, a memory device 304 is shown which maintains the data representing the destination image. The bytes, e.g., byte 306, in memory contain sub-field data; each bit, e.g., bit 308, defines if the corresponding sub-field is on or off at the particular-pixel position. With one byte, eight independent sub-fields can be controlled. Suppose bit n, for n $\in[0 \ldots 7]$, corresponds to the sub-field with illumination level $2^n$. Then, for example, bit 7 corresponds to the sub-field with illumination level $2^7=128$. If no motion compensation is required for a pixel, then the corresponding byte 310 can be directly copied from the memory device 302 storing the source image into the memory device 304 representing the destination image. If the sub-fields from one pixel are compensated with the same spatial offset, then the corresponding byte 312 can be copied from the memory device 302 storing the source image into the memory device 304 representing the destination image. However, the logical address of the pixel is changed, i.e., related to the spatial offset. If no motion compensation is performed for sub-fields, then the bits in the memory location storing the destination image can be direct copies of the corresponding bits from the memory location storing the source image. If motion compensation is performed on sub-fields individually or on groups of sub-fields, with less than 8 elements, then a byte 314, corresponding to pixels of the destination image, can be based on bits from several pixels 316–318 of the source image.

The spatial offset for a sub-field can be calculated by making use of a motion vector. Motion vectors can be derived from the motion vector which is computed by the motion estimator, e.g., the Layered Natural Motion (LNM) motion estimator. This LNM is described in "Layered Natural Motion", by R. J. Schutten et al., in Philips Journal of Research, Vol. 51, No. 2, 1998. This estimator delivers a motion vector $$\overline{m}_{x,y}^{b}$$

for each 8×8 block of pixels in the image. In this case, the motion vectors $$\overline{m}_{x,y}$$

for all pixels in this block are equal, $$\overline{m}_{x,y}^{b}.$$

Layered Natural Motion features an object-based motion estimator. The estimator assigns blocks of 8×8 pixels, belonging to objects in the image, to one of the layers. For example, in case the estimator has three layers, then it can distinguish at least three different objects, i.e., one object that does not move, and two objects moving with different velocities. Motion compensation can be performed on a block of pixels. Especially, in case the motion vectors of the individual pixels of this block are equal. Each 8×8 block D in the destination image is constructed from eight 8×8 blocks S from the source image. This construction is given by:

$$D(x, y) = \sum_{n=0}^{7} S(x + dx_n, y + dy_n) \ \& \ 2^n \tag{6}$$

where x and y are indices within an 8×8 block, and n denotes the sub-field or bit position. For each sub-field, data is read from the source memory shifted over the motion vector of the corresponding sub-field. The bit-wise-AND operation (&) selects the bit which corresponds to that sub-field. The bits are merged by means of the addition. Sub-fields may be combined into one group. For example, bit 0 and bit 2 can be combined. In that case, the mask in Equation 6 changes from $2^n$ into $2^0$ and $2^2$ to select both bits for this sub-field group.

Figure 4:
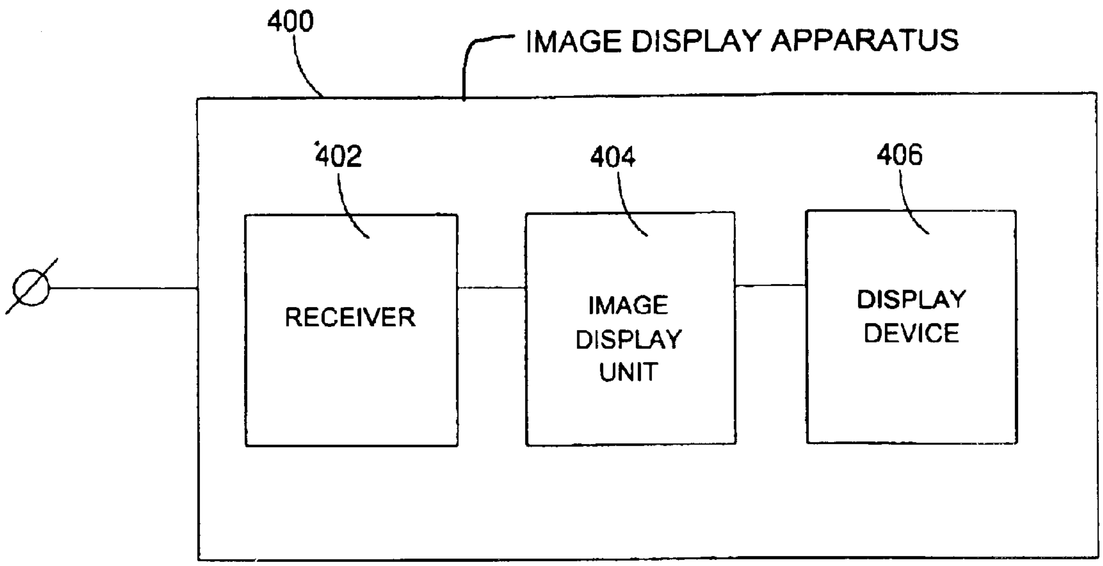
FIG. 4 shows elements of an image display apparatus.

FIG. 4 shows elements of an image display apparatus according to the invention. The image display apparatus 400 has a receiving means 402 for receiving a signal representing the image to be displayed. The signal may be a broadcast signal received via an antenna or cable, but may also be a signal from a storage device, like a VCR (Video Cassette Recorder) or Digital Versatile Disk (DVD). The image display apparatus 400 further has an image display unit 404 for processing the image and a display device 406 for displaying the processed image. The display device 406 is of a type that is driven in sub-fields. The image display unit 404 is implemented as described in connection with FIG. 1.

Figure 5:
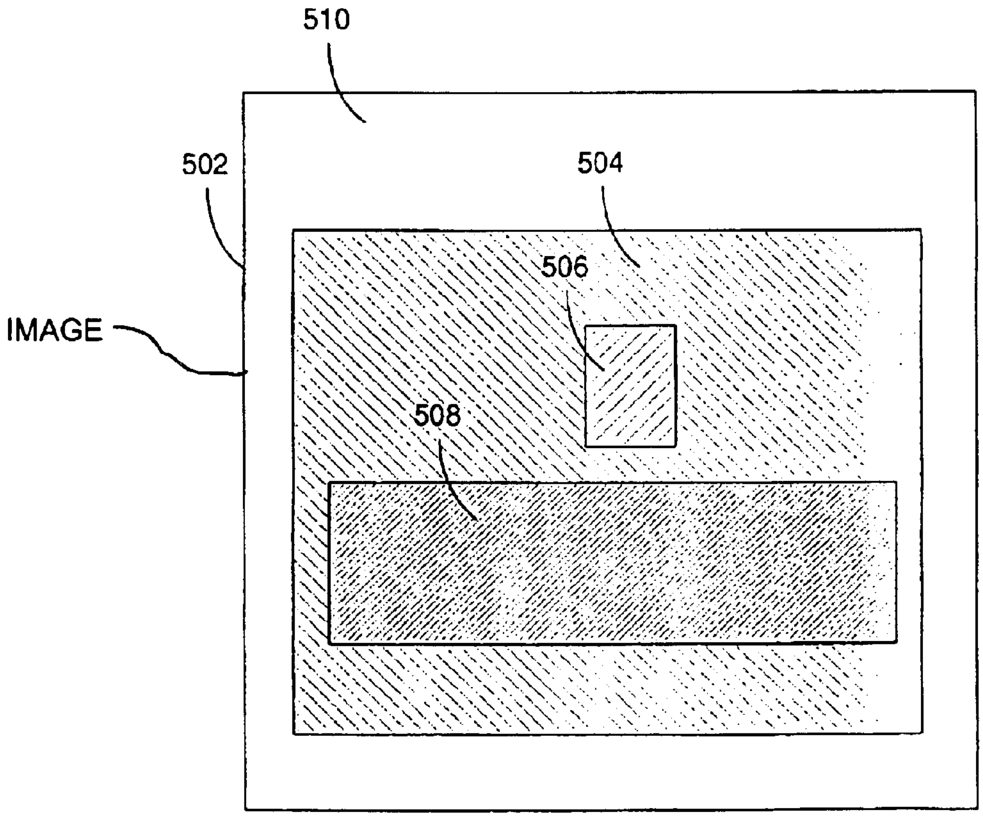
FIG. 5 shows, for one image, the granularity of the operands as used to correct the image.

FIG. 5 shows, for an image, the granularity of the operands as used to compensate the image. The image 502 is divided in a number of regions referenced with 504–510. The granularity of the operands for the motion compensation is different for the various regions:

All sub-fields from the region referenced with 506 are compensated individually;

The motion compensation in region 510 has been performed with, as the operand, the sub-fields of blocks of pixels;

The motion compensation in region 504 has been performed with, as the operand, the sub-fields of individual pixels; and The motion compensation in region 508 has been performed with, as the operand, groups of sub-fields consisting of 4 elements each.

In fact, the image is divided in regions where the motion compensation is performed with relatively high quality, and regions where the motion compensation is performed with a less high quality.

It should be noted that the above-mentioned embodiments illustrate rather than limit the invention, and that those skilled in the art will be able to design alternative embodiments without departing from the scope of the appended claims. In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements and by means of a suitable programmed computer. In the apparatus claims enumerating several means, several of these means can be embodied by one and the same item of hardware.

What is claimed is:

1. An image display unit for displaying pixels of an image in a plurality of periods called sub-fields, said image display unit comprising:

a display device capable of generating in each of the sub-fields a respective illumination level;

computing means for performing operations on sub-fields for motion compensation, the computing means performing the operations for motion compensation on operands with varying granularity, the granularity of the operands ranging from one sub-field individually to a group of sub-fields simultaneously; and an analyzer for estimating available capacity of the computing means for a predetermined period of time, said analyzer determining the granularity of the operands to perform the operations for motion compensation on the basis of said estimated available capacity.

2. The image display unit as claimed in claim 1, characterized in that said image display unit categorizes the pixels of the image in a first subset of pixels on which less than a predetermined number of operations for motion compensation are to be performed, and a second subset of pixels on which more than said predetermined number of operations for motion compensation are to be performed.

3. The image display unit as claimed in claim 1, characterized in that said image display unit categorizes the sub-fields of a pixel in a first group of sub-fields on which less than a predetermined number of operations for motion compensation are to be performed, and a second group of sub-fields on which more than said predetermined number of operations for motion compensation are to be performed.

4. The image display unit as claimed in claim 1, characterized in that the group of sub-fields belongs to a block of pixels.

5. The image display unit as claimed in claim 1, characterized in that the group of sub-fields corresponds to the sub-fields of one pixel.

6. The image display unit as claimed in claim 1, characterized in that the group of sub-fields corresponds to a number of the sub-fields of one pixel.

7. The image display unit as claimed in claim 6, characterized in that the group of sub-fields contains sub-fields that are separated, in time, by less than a predetermined amount.

8. The image display unit as claimed in claim 6, characterized in that the group of sub-fields contains a sub-field with an illumination level greater than a first predetermined level and at least one sub-field with an illumination level less than a second predetermined level, said first predetermined level being greater than said second predetermined level.

9. An image display apparatus for displaying an image, comprising:

receiving means for receiving a signal representing the image;

a display device for displaying the image; and an image display unit for displaying pixels of an image in a plurality of periods called sub-fields on said display device, said image display unit generating, in each of the sub-fields, a respective illumination level, and said image display unit comprising computing means for performing operations on sub-fields for motion compensation, characterized in that the computing means performs the operations for motion compensation on operands with varying granularity, with the granularity of the operands ranging from one sub-field individually to a group of sub-fields simultaneously, and characterized in that said image display unit further comprises an analyzer for estimating available capacity of the computing means for a predetermined period of time, said analyzer determining the granularity of the operands to perform the operations for motion compensation on the basis of said estimated available capacity.

10. A method of displaying pixels of an image in a plurality of periods called sub-fields on a display device, said method comprises the steps of:

generating, in each of the sub-fields, a respective illumination level;

performing a motion compensation step on sub-fields, the motion compensation step being performed on operands with varying granularity, the granularity of the operands ranging from one sub-field individually to a group of sub-fields simultaneously; and estimating available capacity for performing said motion compensation for a predetermined period of time, to determine the granularity of the operands to perform the operations for motion compensation.

* * * * *